March 28, 1967 K. W. STARK 3,311,315

ENDLESS TAPE TRANSPORT MECHANISM

Filed Oct. 29, 1963 3 Sheets-Sheet 1

INVENTOR.
KENNETH W. STARK

BY [signature]

ATTORNEYS

INVENTOR.
KENNETH W. STARK

BY

ATTORNEYS

March 28, 1967 K. W. STARK 3,311,315

ENDLESS TAPE TRANSPORT MECHANISM

Filed Oct. 29, 1963 3 Sheets-Sheet 3

INVENTOR.
KENNETH W. STARK

BY

G. W. O'Brien
F. J. Lees
ATTORNEYS

1

3,311,315
ENDLESS TAPE TRANSPORT MECHANISM

Kenneth W. Stark, Hyattsville, Md., assignor to the United States of America as represented by the Administrator of the National Aeronautics and Space Administration Filed Oct. 29, 1963, Ser. No. 319,892
2 Claims. (Cl. 242—55.19)

The invention described herein may be manufactured and used by or for the Government of the United States of America for governmental purposes without the payment of any royalties thereon or therefor.

This invention relates generally to a tape transport mechanism, and more particularly to a tape transport mechanism for driving and tensioning the recording medium in a magnetic tape recorder.

The telemetry system of a scientific satellite is designed to gather and transmit to ground stations the data needed to evaluate the detailed performance, the environmental conditions, the attitude, and the general functioning of the spacecraft systems. However, satellites are not always in an orbital position from which their data can be immediately relayed to a receiving station on the earth. Therefore, some method of data storing or recording must be used until the satellite is in a position to transmit its information to a ground receiving station. The recording apparatus for space applications is necessarily subject to stringent limitations as to power consumption, weight, size and performance characteristics. The recorder further must have a large data storage capacity and must be extremely reliable and durable since it will be in continuous operation for periods of months or perhaps years.

A recording apparatus employing an endless-loop tape cartridge is presently considered to be the most practical recorder for space applications since the single reel provides compact storage; reversal mechanisms are not required for the record and playback modes; multiple interrogations are possible during the same orbit; the tape can drive beyond one pass without requiring safety cutoff devices for the motors; and tap storage makes momentum compensation simple when required. The tape transport mechanism described herein is especially adapted for use in precision endless-loop magnetic tape recorders of the type capable of being flown in scientific satellites, as well as being useful in less refined recorders.

A primary problem area which must be overcome in the development of tape recorders for space application is that involving instantaneous variation of the linear tape speed as the tape passes the record-playback head, and other tape fluctuations which are commonly referred to as wod, flutter, and skew. The presence of either of these conditions results in distortion of the reproduced signal due to phase or frequency modulation of the signal, and a lowering of the optimum signal-to-noise ratio.

Accordingly, it is an object of the instant invention to provide a new and improved tape transport mechanism for a recording apparatus having excellent high-speed tape driving characteristics.

It is another object of the instant invention to provide a novel tape transport mechanism for imparting a positive tension to the segment of tape passing the recorder transducer heads thereby enabling a stable, accurate, high quality signal to be recorded and played back.

The foregoing and other objects are attained in the present invention through the provision of a recording apparatus comprising a lightweight supporting plate having an endless-loop tape cartridge mounted eccentrically therein, and a tape transport mechanism mounted in the upper region of the plate that is not occupied by the tape cartridge. The tape cartridge consists essentially of a circular tape reel having a spirally coiled tape pack wound thereabout. The lower edges of the tape pack rest on a plurality of circumferentially spaced, radially extending tape support rollers rotatably mounted in a stationary ring. The inner convolution of the tape pack is led from the tape reel periphery upwardly through a tape cover plate and past a tapered guide positioned on the tape cover plate so as to provide tape stability. The tape is then led around and through a guide roller housing which accurately guides and confines the tape before reaching the capstan assembly.

2

The capstan assembly for driving and tensioning the tape comprises dual capstans mounted in the annular region of the support plate and positioned along the tape path on opposite sides of the magnetic record-playback and erase heads. As the tape leaves the guide roller housing it enters the first of these capstans which has an extremely low total indicated runout, thereby providing constant velocity control. The tape is biased into engagement with the capstan and prevented from slipping by a rubber roller assembly springloaded against the capstan so as to press the tape into contact therewith. The tape then passes the transducer heads through a tape guide which assists in preventing vertical motion of the tape as it passes the heads. The tape next is led about the second or main capstan which is positioned with respect to the magnetic heads and the first capstan so as to effect a straight-line path of travel for the tape; thereby causing the tape to pass the heads in a linear manner.

The main capstan is designed to impart a predetermined slightly higher velocity to the tape than the first capstan so as to thereby impart a positive tension to the tape segment passing the magnetic heads. This positive tape tension substantially eliminates instantaneous linear speed variations and fluctuations from this segment of the tape and enables a stable and accurate signal to be recorded and played back. The slightly higher velocity imparted by the second or main capstan is derived from forming the second or main capstan with a slightly greater diameter than the first capstan. Since the linear tape speed at which the tape is being driven by each capstan is proportional to the circumference or peripheral dimension of the capstan it will be seen that the second capstan having a greater circumference has a correspondingly greater linear tape driving speed.

After the tape leaves the capstan assembly it is led through a second guide roller housing and feeds back down onto the outer convolution of the tape pack resting on the tape support rollers of the tape cartridge.

The dual capstans are connected to their drive motors through a common pulley and belt system. Each capstan therefore is adapted to rotate at the same velocity, and the effects of any speed fluctuations introduced by the drive motors on the positive tape tension are negated since the speed of each capstan simultaneously increases or decreases in equal amount. In the illustrated embodiment separate drive motors are employed for the record and playback modes. The linear tape speed will be seen to be dependent upon the capstan r.p.m. which in turn is dependent upon the r.p.m. of the drive motors.

Other objects and many of the attendant advantages of this invention will be readily appreciated as the same becomes better understood by reference to the following detailed description when considered in conjunction with the accompanying drawings, wherein:

FIG. 5(*b*) is a sectional view taken along line 5—5 of FIG. 5(*a*); and

Figure 1:
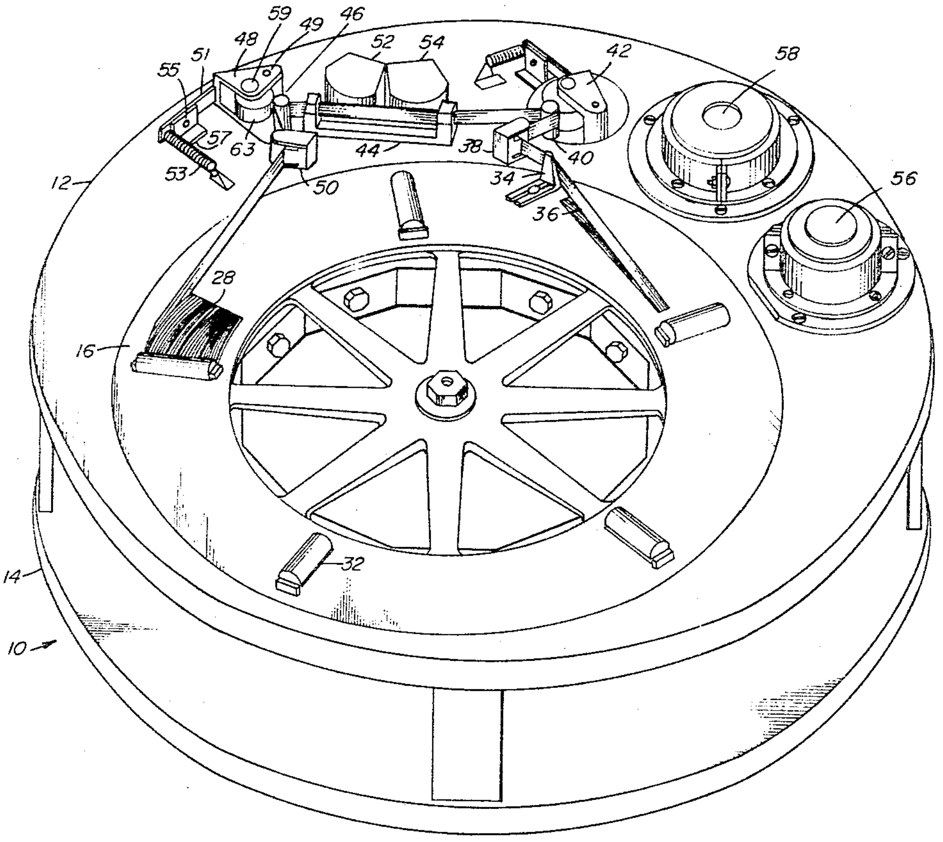
FIG. 1 is an isometric view of the tape recording apparatus embodying the instant invention.
Figure 2:
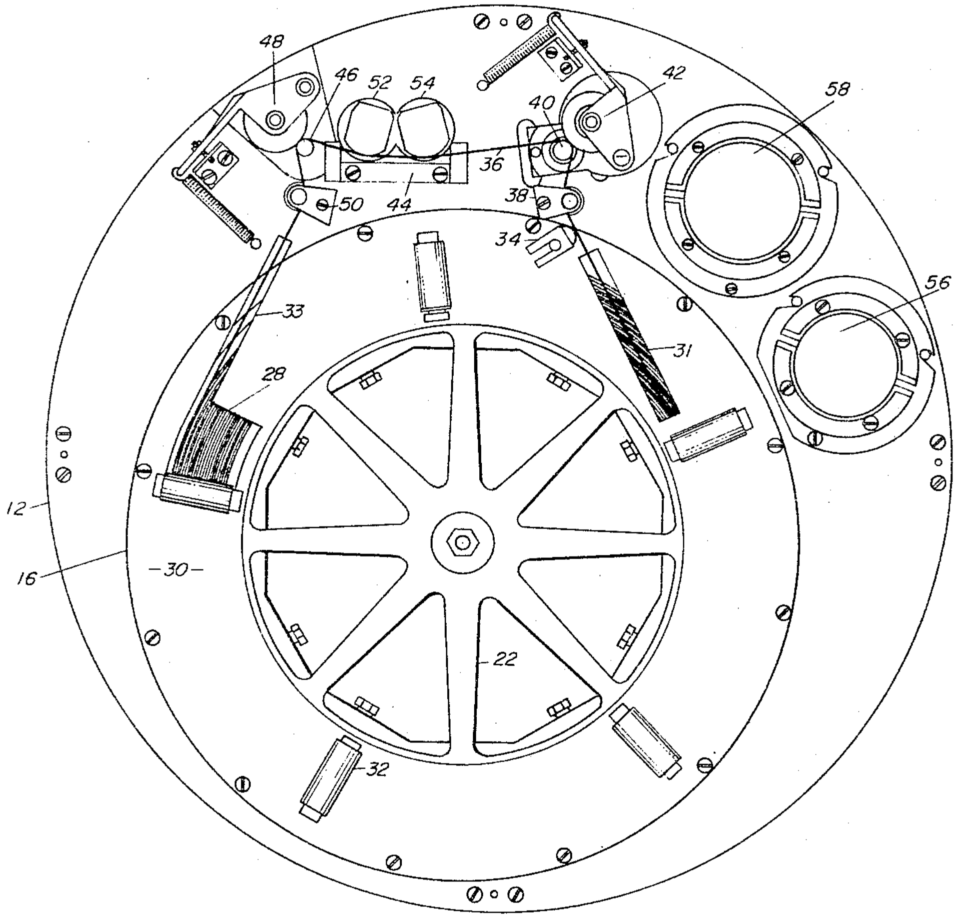
FIG. 2 is a plan view of the recording apparatus.
Figure 3:
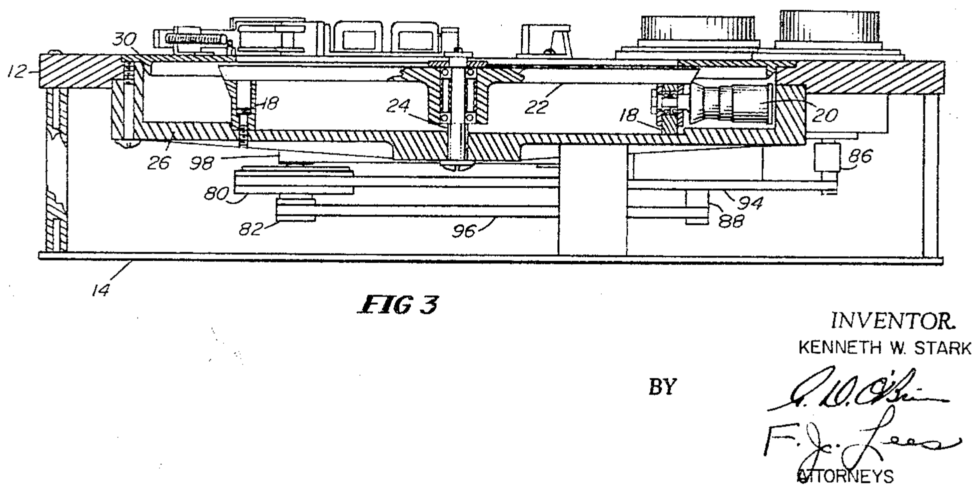
FIG. 3 is an elevational view, partially broken away, of the recording apparatus with tape pack removed.

Referring now to the drawings and more particularly to FIGS. 1 to 3, the tape recorder apparatus 10 is shown as comprising a support plate 12 mounted on a base plate 14 and having a tape cartridge 16 eccentrically mounted therein so as to reduce the overall diametrical dimension of the plates. A tape cartridge especially suitable for use with the recording apparatus described herein is fully disclosed in my copending U.S. patent application Ser. No. 319,893, filed Oct. 29, 1963. The cartridge 16 consists essentially of a stationary roller mounting ring 18 having an array of circumferentially spaced, radially extending rollers 20 (only one of which is shown) mounted for idle rotation therein. A circular tape reel 22 is mounted for idle rotation about a shaft 24 securely fastened in the bottom member 26 of the cartridge.

A spirally coiled tape pack 28, see FIGS. 1 and 2, is wound about the tape reel with the lower edges of its convolutions resting on the array of tape support rollers. A tape cover plate 30 having slots 31 and 33 formed therein is affixed to the support plate 12 in spaced relationship to the array of support rollers. A plurality of guide rollers 32 for restricting vertical displacement of the tape are rotatably mounted on the plate. A tapered guide 34 is positioned on the tape cover plate to align the tape 36 as it is drawn through slot 31 from the inner convolution of the spirally coiled tape pack.

The tape transport mechanism will be seen to include along the path of travel of tape 36 a guide roller housing 38; a first capstan 40; a spring-loaded rubber roller assembly 42 biased into engagement with the first capstan; a vertical tape guide 44; a second or main capstan 46; a second spring-loaded rubber roller assembly 48 biased into engagement with the second capstan; and a second guide roller housing 50. These components will be described in detail below. The tape 36 is drawn from the tape cartridge, passes through the first guide roller housing, around the dual capstans which are positioned so as to effect a linear pass of the tape by the transducer heads, through the second guide roller housing and back onto the outer periphery of the tape pack stored in the tape cartridge.

The record-playback and erase heads 52, 54 are mounted in the support plate 12 between the first and second capstans and are indented a few thousandths of an inch into the tape path for maintaining contact with the tape. The record and playback motors 56, 58 for driving the capstans are mounted in the upper region of the support plate in a clockwise direction from the aforesaid components positioned along the tape path. The drive arrangement connecting the record and playback motors to the capstans will be described hereinafter in conjunction with FIG. 4.

Figure 4:
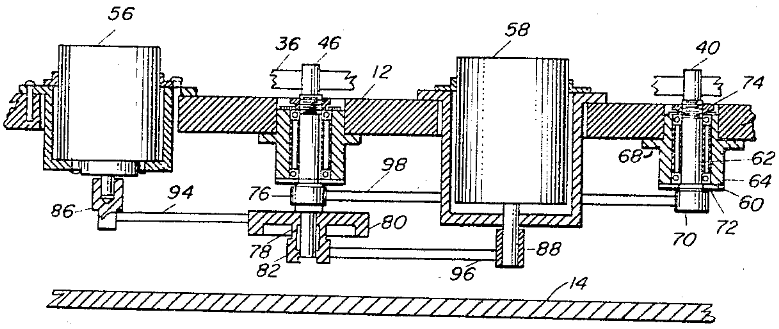
FIG. 4 is a partially schematic, sectionalized view illustrating the mounting of the dual capstans of the tape transport mechanism in the support plate and the drive arrangement for the capstans.

In FIG. 4 the mounting of the dual capstans 40, 46 is illustrated. The first capstan assembly comprises the capstan 40 mounted in duplex bearings 60 separated by spacers 62 in the basket or housing 64. The housing 64 is mounted in an opening formed in the support plate 12 by means of threaded fasteners passing through slots (not shown) provided in the projections 68 extending laterally from the housing. The use of such slots allows the capstan assembly a limited lateral movement for adjusting the spacing between the two capstans. A pulley surface 70 is formed at the lower end of the capstan. The end caps 72 and the preload nut 74 are employed to retain the bearings and the capstan in alignment within the housing.

The second or main capstan 46 is mounted to the support plate 12 in similar manner to the first capstan 40 excepting that slots for allowing lateral movement of the housing are not utilized. A pulley surface 76 having the identical preselected diameter to the pulley surface 70 of the first capstan is provided approximately midway on the capstan. A pulley cluster 78 is provided below pulley 76 on the lower end of capstan 46 for connecting the main capstan to the record and playback motors 56, 58. It will be noted that the pulley cluster 78 consists of two surfaces 80, 82 of different diameters. For ease of assembly the pulley member 78 may be separately constructed and press-fit onto the capstan 46.

As pointed out above, one of the primary problems of high speed, highly refined tape recorders is that of signal distortion caused by tape fluctuations and linear speed variations as the tape passes the record-playback head. The capstans of the present invention are constructed to minimize this problem by applying a positive tension to the tape segment linearly passing the magnetic heads. This is done by providing the second or main capstan 46 with a slightly greater diameter than the first capstan 40. Since the linear tape speed at which the tape 36 is driven by each capstan is proportional to the peripheral dimension of the capstan, it will be seen that the main capstan having a greater peripheral dimension has a correspondingly greater linear tape driving speed. This differential in tape driving speeds introduces a positive tape tension between the capstans and serves to substantially eliminate instantaneous fluctuations and speed variations from this segment of the tape, thereby permitting a stable and accurate signal to be played back.

The motors 56, 58 providing the drive power for the dual capstans are illustrated in FIG. 4. It is readily apparent that the motors and capstans are schematically arranged in FIG. 4 to best illustrate the drive arrangement between motors and capstans. FIGS. 1 to 3 should be referred to for the actual positioning of these elements. The type motors utilized do not constitute per se a part of the instant invention and will not be described in detail herein. A description of similar type motors, their characteristics and associated switching, utilized in an earlier form of recording apparatus may be found in National Aeronautics and Space Administration Technical Note D–1542, published in February 1963, entitled, "A Precision Endless-Loop Magnetic Tape Recorder for Space Applications," by R. C. Falwell, K. W. Stark, and A. F. White. Further, it is contemplated that a single dual speed, brushless D.C. motor or a single dual speed, hysteresis, synchronous motor may be substituted for the two motors illustrated.

A record motor pulley 86 and a playback motor pulley 88 are affixed to their respective motor shafts. Endless-loop polyester film belts 94, 96 connect the motor pulleys 86, 88 respectively to the main capstan pulley cluster 78. A further polyester belt 98 connects the pulley 76 on the main capstan to the pulley 70 on the first capstan. The pulley surfaces 70, 76 must be precisely machined so as to have identical outer diameters thereby insuring uniform rotational speed of the capstans.

Figure 5:
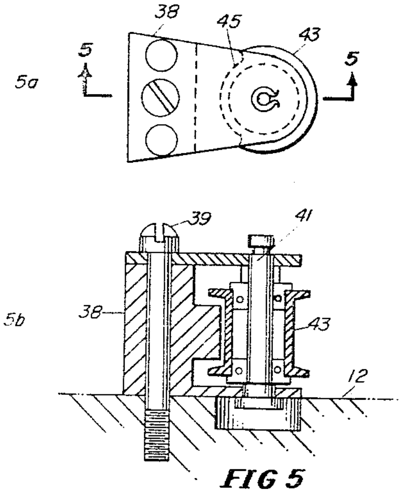
FIG. 5(*a*) is a plan view of the guide roller housing.

In FIG. 5 one of the two identical guide roller housing components of the tape transport mechanism is shown. The component comprises a housing 38 threadedly secured to the support plate 12 by means of a threaded fastener 39. The shaft 41 for the guide roller 43 is aligned in upper and lower flanges extending from the roller housing 38. The roller 43 is rotatably mounted about the shaft and the tape 36 which is drawn therethrough is guided and confined between the curvilinear surface 45 of the housing and the roller periphery.

Figure 6:
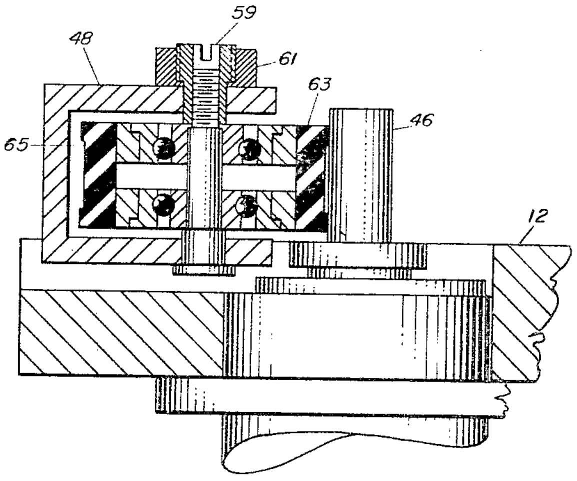
FIG. 6 is a partially sectionalized, enlarged view illustrating the rubber roller assembly biased into engagement with a capstan of the tape transport mechanism.

One of the identical rubber roller assemblies for biasing the tape against the capstans is depicted in FIG. 6 taken in conjunction with FIG. 1. The rubber roller assembly consists of a housing 48 mounted about a pivot shaft 49 secured in the support plate 12 and having an arm 51 extending therefrom. The arm 51 is engaged by a spring 53 attached to the support plate and biasing the housing 48 towards the capstan 46. A screw 55 passing through the arm and limit angle 57 mounted on the support plate limits the movement of the housing towards the capstan. The roller shaft 59, threaded on its upper end, passes through and is secured in the housing 48 by nut 61. A rubber roller 63 is rotatably mounted through duplex bearings about the shaft 59. A slot 65 is formed in the rubber roller periphery to help guide the tape 36 passing between the capstan and roller and to prevent its vertical motion. The slot is cut to a depth slightly less than the thickness of the tape; for example, if the tape were .0014 inch thick the slot could be cut .0010 inch deep.

To further describe the present invention, some parameters of the tape transport mechanism of one existing embodiment will now be summarized. The tape utilized comprised 1200 feet of a 0.25 inch-wide lubricated magnetic tape having a thickness of 0.0014 inch. The first capstan had a diameter of .2475 inch. The second or main capstan had a diameter of .2500 inch. The capstans had maximum runout of $5\times10^{-5}$ inch and the rotating components were mounted utilizing the duplex bearing technique. The bearings were preloaded. The polyester belt drives consisted of 0.001 inch thick Mylar belts. The drive system was designed to provide a record speed of 3.75 inch/sec. and a playback speed of 30 inches/sec. It will be evident to those skilled in the art that the magnitudes and dimensions set forth above are merely exemplary and may be altered to meet the requirements of the desired recording system.

Obviously, numerous modifications and variations of the present invention are possible in the light of the above teachings. It is, therefore, to be understood that within the scope of the appended claims the invention may be practiced otherwise than as described herein.

What is claimed as new and desired to be secured by Letters Patent of the United States is:

1. A tape transport mechanism for an endless-loop tape recorder comprising:

a base plate;

an annular support plate mounted on said base plate;

said support plate having a circular opening eccentrically formed therein defining a peripheral support surface of varying width;

a tape cartridge mounted in said opening;

said tape cartridge including a tape cover plate mounted flush with the upper surface of said support plate and having first and second slots formed therein;

first and second capstans mounted in the widest portion of said peripheral support surface;

first and second transducer heads mounted on said peripheral support surface between said first and second capstans;

a motor mounted on said peripheral support surface;

a pulley arrangement connecting said motor to said first and second capstans;

said pulley arrangement applying an equal rotational force originating from said motor to each of said capstans;

said first capstan being of slightly lesser diameter than said second capstan whereby a slightly greater speed is imparted to said tape by said second capstan to tension said tape as it passes the transducer heads; and an endless loop of at least 1000 feet of magnetic recording tape spirally wound on said cartridge with the innermost convolution of said tape drawn through said first slot by said capstans, past said transducer heads, and returned to the outer periphery of the spiral winding through said second slot.

2. The transport mechanism of claim 1 wherein spring-loaded pressure rollers are pivotally mounted adjacent each of said first and second capstans to contact said tape and prevent slippage thereof as it is driven by said capstans.

References Cited by the Examiner

UNITED STATES PATENTS

| | | | |
|---|---|---|---|
| 2,624,574 | 1/1953 | Camras | 226—183 X |
| 2,656,184 | 10/1953 | Eddy | 242—55.19 |
| 2,806,658 | 9/1957 | Truesdale | 242—55.12 |
| 2,853,923 | 9/1958 | Daniel | 242—55.19 X |
| 2,995,313 | 8/1961 | Namenyi-Katz | 242—55.11 |
| 2,998,906 | 9/1961 | Vice et al. | 226—190 X |
| 3,021,989 | 2/1962 | Sellers | 226—118 |
| 3,079,100 | 2/1963 | Brown et al. | 242—186 |
| 3,085,758 | 4/1963 | Herrmann et al. | 242—55.12 |
| 3,123,271 | 3/1964 | Johnson | 226—186 |
| 3,145,942 | 8/1964 | Luckey et al. | 242—55.12 |

FOREIGN PATENTS

| | | |
|---|---|---|
| 1,306,575 | 9/1962 | France. |

FRANK J. COHEN, *Primary Examiner.*

MERVIN STEIN, B. S. TAYLOR, *Assistant Examiners.*